Dec. 24, 1963   G. G. WARD   3,115,191
TWO-WAY PLOW WITH DISKS FOR COULTERS AND MOLDBOARDS
Filed April 16, 1962   3 Sheets-Sheet 1
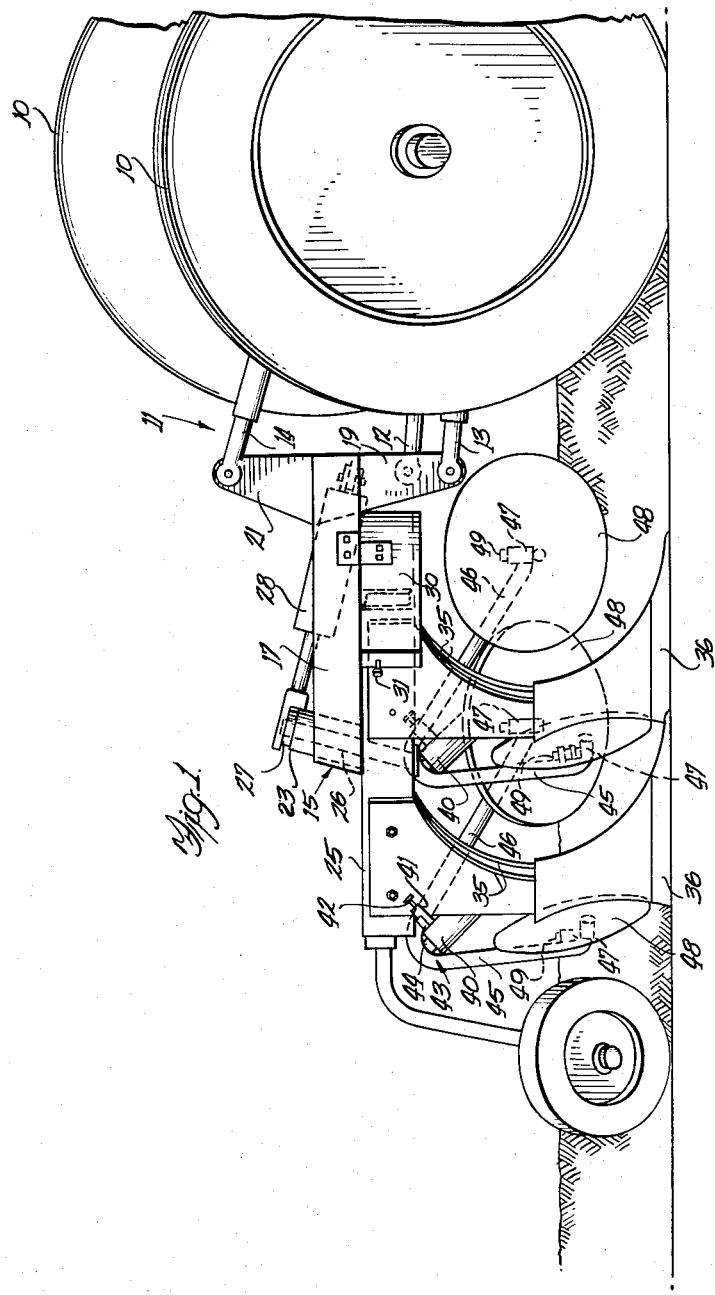
Inventor
Gerald G. Ward
Paul O. Pippel
Attorney

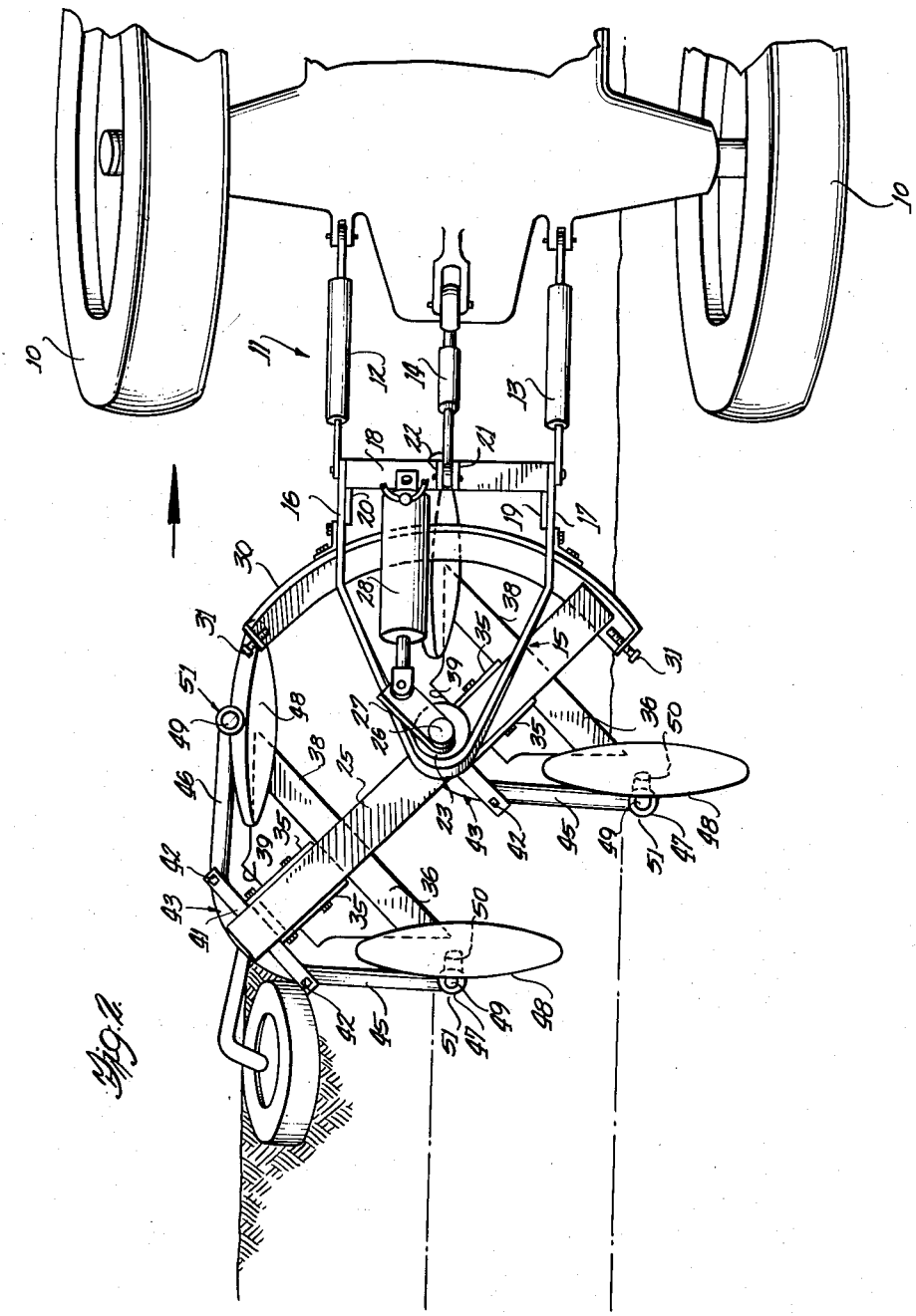

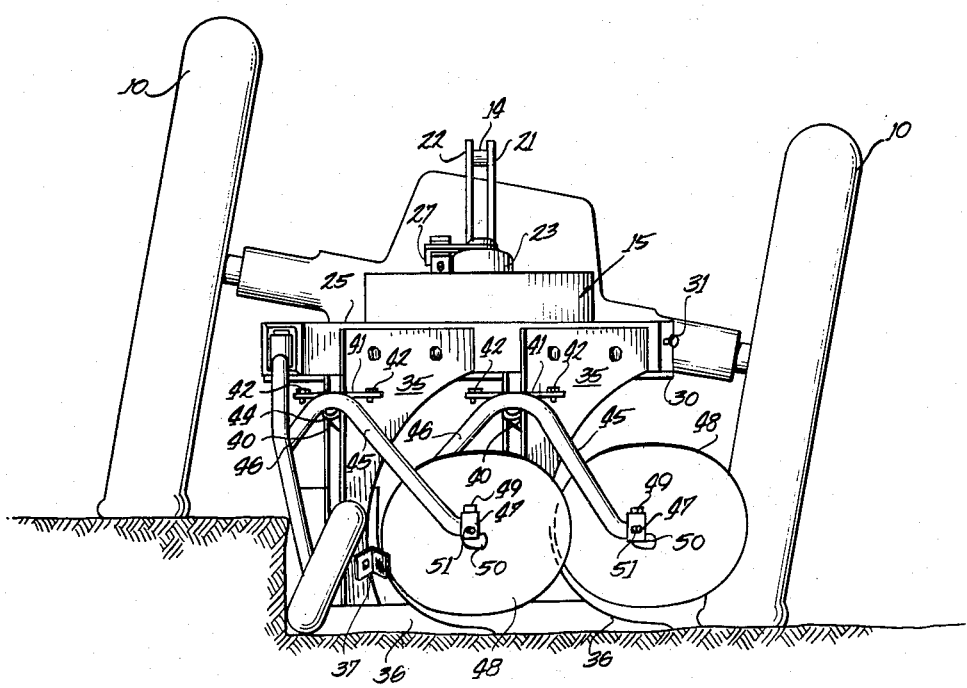
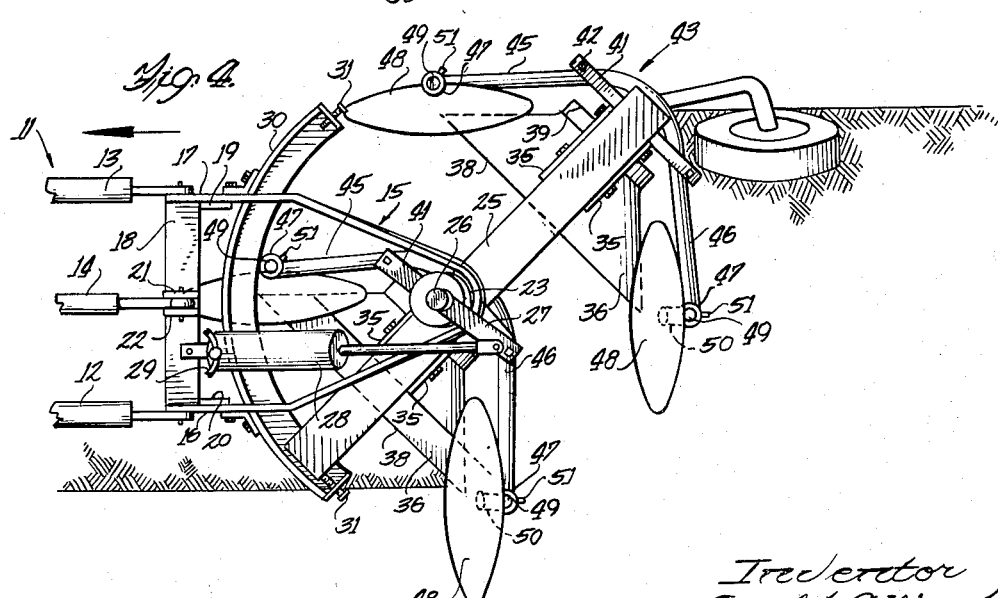

3,115,191
TWO-WAY PLOW WITH DISKS FOR COULTERS
AND MOLDBOARDS
Gerald G. Ward, Naperville, Ill., assignor to International Harvester Company, Chicago, Ill., a corporation of New Jersey
Filed Apr. 16, 1962, Ser. No. 187,504
9 Claims. (Cl. 172—162)

The present invention relates in general to agricultural implements, and more particularly to a new and improved two-way moldboard type plow.

Two-way plows are well known in the art, and consist essentially of two sets of opposed bottoms that are used selectively, the right-hand bottoms being used in one direction of travel and the left-hand bottoms being used on the return trip. In the past the two sets of bottoms have been mounted either on separate frames so that they can be raised and lowered independently, or they have been mounted on opposite sides of a common frame that is rotated about either a longitudinal or lateral axis when the plow is raised at the end of the field. Because of the necessity of two separate sets of bottoms, the two-way plow of conventional design has proved to be a weighty and expensive implement. The general purpose of the present invention is therefore to provide a two-way moldboard type plow which functions effectively, yet which obviates the problem of providing two separate sets of bottoms. To attain this, the present invention contemplates the use of a unique disk arch which cooperates with a single set of bottoms to render the implement capable of two-way moldboard plow action.

An object of the present invention is the provision of a light-weight, relatively inexpensive two-way moldboard plow.

Another object of the invention is to provide an implement which will function as a two-way plow, yet which requires only a single set of bottoms.

A further object of the invention is the provision in a two-way plow of means which operate as a rotary type moldboard, and means which operate as a disk jointer type coulter.

A still further object of the invention is the provision of means for automatically shifting the rotary moldboard means and disk jointer type coulter means to and from right and left-hand plowing positions, thus obviating the necessity of providing a shifting linkage.

Other objects and advantages of the invention will hereinafter become more fully apparent from the following description of the annexed drawings which illustrate a preferred embodiment, and wherein:

FIGURE 1 is a side elevational view of a preferred embodiment of the invention;

FIGURE 2 is a plan view of the apparatus shown in FIGURE 1;

FIGURE 3 is a rear elevational view of the apparatus illustrated in FIGURES 1 to 3, and FIGURE 4 is a plan view similar to FIGURE 2, but with the plow traveling in the opposite direction.

Referring now to the drawings, the numeral 10 designates the laterally spaced rear drive wheels of a conventional tractor having a hitch structure 11 of the three-point type, which is well known in the art, pivotally connected thereto for vertical movement relative to the tractor. Such movement is accomplished by means, not shown, deriving power from the tractor. Hitch structure 11 includes a pair of laterally spaced lower links 12 and 13, and a centrally disposed upper link 14.

The two-way plow of the present invention includes a substantially V-shaped frame 15 having fore and aft extending legs 16 and 17. A transversely extending member 18 is secured to the forward end of legs 16 and 17. A pair of depending brackets 19 and 20 are secured to the end portions of transverse member 18, and have the end portions of lower links 13 and 12, respectively, secured thereto. A pair of upstanding brackets 21 and 22 are secured adjacent the central portion of transverse member 18, and have the end of upper hitch link 14 secured therebetween. The rearward end of frame 15 has a hollow cylindrically shaped sleeve 23 fixedly mounted therein, as by welding or the like.

A beam 25 is swingably mounted to frame 15 for movement to and from right and left-hand plowing positions by having a substantially vertically extending shaft 26 journalled in hollow sleeve 23. The mechanism by which the lateral swinging or indexing of beam 25 is accomplished forms no part of this invention, but it may be understood to include a hydraulic cylinder 28 receiving fluid under pressure through hose lines 29 from a source, not shown, on the tractor. The cylinder 28 is anchored at one end to transverse member 18, and is connected at the other end to an arm 27 secured to the upper end of shaft 26.

A quadrant 30, L-shaped in cross section to form a trackway, is fixedly secured to frame arms 16 and 17. Adjustable screw stop members 31 are provided in the end portions of quadrant 30, and are engageable with the forward end of beam 25 to limit the swinging movement thereof.

A plurality of pairs of standards 35, depending upon the number of bottoms to be used with the plow, are mounted on opposite sides of beam 25 at spaced-apart points therealong. Share sections 36 are removably mounted upon standards 35 in any conventional manner, as by brackets 37 or the like. Share sections 36 are substantially trapezoidal in shape, having their parallel edges 38 and 39 disposed substantially perpendicularly to the longitudinal axis of beam member 35. Share sections 36 are curved longitudinally, which causes their intermediate portion to act as the shin of a conventional moldboard plow. Since the lower portion of share section 36 is subjected to the most wear, it may be removably mounted to the rest of the share section.

Hollow cylindrical sleeves 40 are mounted between each pair of standards 35 and are angularly disposed with respect to beam 25. Each sleeve has a transversely extending bar 41 secured to the upper portion thereof, which are provided with adjustable screw stops 42 adjacent their end portions, the purpose of which will hereinafter become more fully apparent. Substantially V-shaped arch members 43 are mounted for oscillating movement in each sleeve 40. Arch members 43 include converging leg portions 45 and 46, and a shaft 44 formed at the junction of legs 45 and 46 and receivable in sleeve 40.

Adjustable screw stops 42 are engageable with the converging leg portions 45 and 46 of arch member 43 to limit the swinging movement of the arch member in sleeve 40.

The end of each arm is provided with a sleeve 47 extending substantially perpendicular thereto. Disks 48 are mounted on arch arms 45 and 46 by having the angled portion 49 of shaft 50, upon which the disk is mounted, extend through sleeve 47. Vertical adjustment of the disks 48 with respect to the arch arms is accomplished by providing a plurality of apertures in shaft portion 49 and sleeve 47, and a pin 51 cooperable therewith. Shaft 50 is positioned at the center of disk 48, which is freely rotatable therearound.

With particular reference to FIGURES 1 to 3 it will be noted that with the implement in the right-hand plowing position, the disks 48 on arch arms 46 are disposed in coulter relation with respect to share sections 36. The natural upward soil force will keep the disks on arch arms 46 in the proper upright position, the depth of penetration of the disk being limited by the engagement of adjustable screw stop 42 with arch arm 46. When the disk on arch arm 46 is in coulter position, arch arm 45 is of such a length as to dispose the disk thereon in overlapping relation with share section 36 to act as a rotary moldboard.

When the end of a field is reached, the plow is lifted from the ground and beam 25 is shifted into the left-hand plowing position illustrated in FIGURE 4. With the plow in the left-hand plowing position it will be noted that due to the pivoting action of shaft 44 in sleeve 40, the disk 48 on arm 45 is now disposed in proper coulter relation with respect to share section 36, as determined by the engagement of adjustable screw stop 42 with arch arm 45. The natural upward soil force will retain the disk arm on arch arm 45 in this position, and thus dispose the disk on arch arm 46 in proper rotary moldboard relation with respect to share section 36.

From the foregoing it should be apparent that what has been provided is a simple, light-weight two-way plow which has obviated the necessity of providing duplicate bottom equipment. This result is accomplished by the pivoting action of arch 43 in response to the upward soil force to automatically alternately have disks 48 act as a rotary moldboard and a disk jointer type coulter, as required by the direction of plowing.

The foregoing disclosure relates to only a preferred embodiment of the invention, and numerous modifications or alterations may be made therein without departing from the spirit or scope of the invention as set forth in the appended claims.

What is claimed is:

1. A two-way moldboard type plow comprising a frame adapted to be connected to a source of motive power, a beam pivotally mounted on said frame for horizontal swinging movement to and from right and left-hand plowing positions, at least one share section fixedly secured to said beam, a first arm pivotally secured to said beam and having a ground-engaging disk rotatably mounted thereon, a second arm associated with said first arm and responsive to movement thereof, said second arm having a ground-engaging disk rotatably mounted thereon, the disk on one of said arms being responsive to the upward soil force to dispose said disk in proper coulter relation with respect to said share section and to dispose the disk on the other arm in rotary moldboard relation to said share section, each arm being operatively responsive to the indexing of said beam from one plowing position to another to shift said first disk from a coulter position to a rotary moldboard position and said other disk from a rotary moldboard position to a coulter position, a means for indexing said beam.

2. A two-way moldboard type plow comprising a frame adapted to be connected to a source of motive power, a beam pivotally mounted on said frame for horizontally swinging movement to and from right and left-hand plowing positions, at least one share section fixedly secured to said beam, an arch member pivotally secured to said beam adjacent each share section, said arch member including a first arm having a disk rotatably mounted thereon, said disk being engageable with the ground when the plow is traversing a field in one direction and responsive to upward soil force to assume a coulter position with respect to said share section, said arch member further including a second arm operatively associated with said first arm and responsive to movement thereof, said second arm having a ground-engaging disk rotatably mounted thereon adapted to assume a rotary moldboard position with respect to said share section when said disk on said first arm is in the coulter position, each arm being operatively responsive to the indexing of said beam of one plowing position to another to shift said first disk from a coulter position to a rotary moldboard position and said other disk from a rotary moldboard position to a coulter position, and means for indexing said beam.

3. A two-way moldboard type plow comprising a frame adapted to be connected to a source of motive power, a beam pivotally mounted on said frame for horizontal swinging movement to and from right and left-hand plowing positions, at least one share section fixedly secured to said beam, an arch swingably mounted on said beam adjacent each share section, a pair of ground-engaging disks mounted on each arch, one of said disks being disposed in coulter relation with respect to said share section and the other of said disks being disposed in rotary moldboard relation with respect to said share section when said beam is in one plowing position, each arch being operatively responsive to the indexing of said beam from one plowing position to another to shift said first disk from a coulter position to a rotary moldboard position and said other disk from a rotary moldboard position to a coulter position, and means for indexing said beam.

4. The invention set forth in claim 3 wherein each arch is a substantially V-shaped member comprising a pair of arms operatively associated at their convergent ends and having said disks rotatably mounted on their opposite divergent ends.

5. A two-way moldboard type plow comprising a frame adapted to be connected to a source of motive power, a beam pivotally mounted on said frame for horizontal swinging movement to and from right and left-hand plowing positions, at least one share section fixedly secured to said beam, an arch member pivotally secured to said beam adjacent each share section, said arch member including a first arm having a ground-engaging disk rotatably mounted thereon, said disk being disposed in substantially upright position in front of said share section when said plow is traversing a field in one direction to thereby act as a disk jointer type coulter, said arch member further including a second arm having a ground-engaging disk rotatably mounted thereon, said second arm being operatively associated with said first arm and responsive to movement thereof to position said second arm disk in overlapping relation with said share section, said second arm disk thereby acting as a rotary moldboard when said first arm disk is in the coulter position, each arm being operatively responsive to the indexing of said beam from one plowing position to another to shift said first arm disk from a coulter position to a rotary moldboard position and said second arm disk from a rotary moldboard position to a coulter position, and means for indexing said beam.

6. The invention set forth in claim 5 wherein a plurality of share sections are provided at spaced-apart points along said beam.

7. The invention set forth in claim 5 wherein means are provided on said arms for vertically adjusting said disks.

8. A two-way moldboard type plow comprising a frame adapted to be connected to a source of motive power, a beam pivotally mounted on said frame for horizontal swinging movement to and from right and left-hand plowing positions, at least one share section fixedly secured to said beam, means defining a pivot axis angularly disposed with respect to said beam adjacent each share section, an arch member oscillatable about each axis, each arch member having a pair of ground-engaging disks rotatably mounted thereon, one of said disks being disposed in coulter relation with respect to said share section and the other of said disks being disposed in rotary moldboard relation with respect to said share section when said beam is in one plowing position, each arch being operatively responsive to the indexing of said beam from one plowing position to another to shift said first disk from a coulter position to a rotary moldboard position and said other disk from a rotary moldboard position to a coulter position, and means for indexing said beam.

9. The invention set forth in claim 8 wherein said pivot means are provided with adjustable stops engageable with said arch to limit the oscillating movement thereof.

References Cited in the file of this patent

UNITED STATES PATENTS

| | | |
|---|---|---|
| 940,923 | Christensen | Nov. 23, 1909 |
| 1,165,267 | McKay | Dec. 21, 1915 |
| 2,232,298 | Wooley | Feb. 18, 1941 |
| 2,546,554 | McElroy | Mar. 27, 1951 |

FOREIGN PATENTS

| | | |
|---|---|---|
| 168,779 | Austria | Aug. 10, 1951 |
| 856,328 | Great Britain | Dec. 14, 1960 |
| 281,661 | Switzerland | July 1, 1952 |